United States Patent
Chen et al.

(10) Patent No.: US 10,733,907 B2
(45) Date of Patent: Aug. 4, 2020

(54) BRAILLE DISPLAY

(71) Applicants: CHINA BRAILLE PRESS, Beijing (CN); BEIJING JIAOTONG UNIVERSITY, Beijing (CN)

(72) Inventors: Xin Chen, Beijing (CN); Houjin Chen, Beijing (CN); Meng Han, Beijing (CN); Qilin You, Beijing (CN); Tianqi Wang, Beijing (CN); Yang Yang, Beijing (CN)

(73) Assignees: CHINA BRAILLE PRESS, Beijing (CN); BEIJING JIAOTONG UNIVERSITY, Beijing (CN)

( * ) Notice: Subject to any disclaimer, the term of this patent is extended or adjusted under 35 U.S.C. 154(b) by 228 days.

(21) Appl. No.: 15/735,192

(22) PCT Filed: Jun. 7, 2016

(86) PCT No.: PCT/CN2016/085177
§ 371 (c)(1),
(2) Date: Dec. 10, 2017

(87) PCT Pub. No.: WO2016/197928
PCT Pub. Date: Dec. 15, 2016

(65) Prior Publication Data
US 2018/0174487 A1    Jun. 21, 2018

(30) Foreign Application Priority Data

Jun. 11, 2015 (CN) .......................... 2015 1 0320702

(51) Int. Cl.
*G09B 21/00* (2006.01)
*G06F 3/01* (2006.01)
*G09F 9/37* (2006.01)

(52) U.S. Cl.
CPC ............. *G09B 21/004* (2013.01); *G06F 3/01* (2013.01); *G09F 9/37* (2013.01)

(58) Field of Classification Search
CPC .................................................. G09B 21/004
See application file for complete search history.

(56) References Cited

U.S. PATENT DOCUMENTS 5,685,721 A    11/1997  Decker

FOREIGN PATENT DOCUMENTS

| CN | 102176293 A | 9/2011 |
| CN | 102184662 A | 9/2011 |

(Continued)

OTHER PUBLICATIONS

International Search Report and Written Opinion of PCT/CN2016/085177 filed Jun. 7, 2016.

(Continued)

*Primary Examiner* — Kesha Frisby
(74) *Attorney, Agent, or Firm* — Notaro, Michalos & Zaccaria P.C.

(57) ABSTRACT

A braille display, belonging to the technical field of blind people reading devices, uses a memory alloy material to realize recessing and protruding of a braille point array of the braille display. The braille display is mainly composed of any number of braille recessing-protruding dot arrays, each of which includes several individual point locations, an outer frame and signal boards. Each of the individual dots comprises upper and lower telescoping members, an upper conductive connecting member, an intermediate conductive connecting member, a lower conductive connecting member, external sleeve locks and guide rods. The recessing-protruding change of braille points is realized through specific connection of various specific components. By using the braille display, the endurance capability is (Continued)

improved, and the cost is reduced. Moreover, since the braille display has a relatively small volume, the braille display can be applied to a mobile portable device or a wearable device.

8 Claims, 2 Drawing Sheets

(56) References Cited

FOREIGN PATENT DOCUMENTS

| | | |
|---|---|---|
| CN | 103413504 A | 11/2013 |
| CN | 104036672 A | 9/2014 |
| CN | 203941633 U | 11/2014 |
| CN | 204130003 A | 1/2015 |
| CN | 204204266 U | 3/2015 |
| CN | 104851337 A | 8/2015 |
| JP | 2001265213 A | 9/2001 |

OTHER PUBLICATIONS

First Office Action of Chinese Application No. CN104851337 filed Aug. 19, 2015.
Notification of Patent Grant of Chinese Application No. CN104851337 filed Aug. 19, 2015.
The State Intellectual Property Office of People's Republic of China, Office Action for the priority Application CN 201510320702.2 dated Dec. 7, 2016.

BRAILLE DISPLAY

TECHNICAL FIELD

The present invention pertains to the technical field of reading devices for blind people, and particularly to a braille display.

BACKGROUND ART

Blind people, unable to see things with eyes like normal people do, mainly rely on the auditory sense of ears and the tactile sense of fingers to acquire external information. In order to facilitate the studying and information communication of the blind people, some documents in Chinese, English, French or other languages are usually converted to braille books for the blind people to read. The braille, also called as dot character or embossed character, is the writing specially designed for the blind people and perceived mainly by the tactile sense. Generally, each braille dot character includes 6 dots, and these 6 dots are equally divided into two groups arranged side by side. The braille books are formed by making different combinations of the braille dot characters on paper sheets by means of a braille plate, a braille typewriter or a braille printer.

With the development of informatization and popularization of personal computer, there has appeared Chinese character braille conversion software which can be installed in computers. Such software can convert the Chinese characters in a computer to braille coding. However, the personal computers generally display graphics or texts through a screen, while the blind people cannot see the braille displayed on the computer screen. The braille dot character display, shorted as dot display, also called as braille electronic display or braille typewriter, can synchronously display using braille the information in the computer for facilitating touch reading of the blind people, and through cooperation with the screen reader, can display using braille the text read by a screen reader on a display. Braille dots on the display will automatically protrude, and the blind people read the text through the tactile sense.

Currently, the braille displays in domestic and overseas markets are mainly made from piezoelectric materials, and they trigger the conversion of recessing and protruding of the braille dots by controlling changes of volumes of the piezoceramics, therefore, they are large in volume and high in cost. Besides, designing the braille display with ultrasonic wave arrays and electroactive polymer (EPA) materials is being under research in overseas laboratories, but they are too high in cost to be commercialized, and have not been publicly presented yet. A braille display developed and manufactured by Tsinghua University consists of 40 automatic braille units, and can convert the text information in the computer to the braille by a screen reader and then automatically display the braille, thus the blind people can acquire the information displayed on the computer screen by touching with hands the braille dot characters on the braille units. However, since it realizes the conversion of recessing and protruding of the braille dots by controlling changes of the volumes of the piezoceramics, it has a too big volume; besides, a new recessing-protruding dot array sensor made by Tsinghua University in cooperation with Japan is manufactured by an extremely deformable electrostrictive material, and has a high driving voltage and a complex driving circuit, therefore, the driving circuit has a big volume, and the whole product is not easy to carry, and is high in cost. On the other hand, the cost is relatively high, thus it cannot meet the conditions of common families of blind people, and currently is mostly purchased by educational establishments for blind people.

DISCLOSURE OF THE INVENTION

With regard to the problems of the existing braille displays such as complex structure, relatively big volume, and relatively high cost, the present invention provides a braille display. A recessing-protruding dot array (concave-convex point array) of the braille display is formed by arranging multiple dots, each dot includes: an upper telescoping member, a lower telescoping member, an upper conductive connecting member, an intermediate conductive connecting member, a lower conductive connecting member, external sleeve locks, and guide rods, wherein the guide rods include an upper guide rod and a lower guide rod, which two guide rods are coaxially vertically arranged, and fixed through the intermediate conductive connecting member, a top end of the intermediate conductive connecting member is connected with the upper conductive connecting member through the upper telescoping member, a bottom end of the intermediate conductive connecting member is connected with the lower conductive connecting member through the lower telescoping member; the external sleeve locks are each placed at a location where the respective telescoping member and the respective conductive connecting member are connected with each other, for fixing the respective telescoping member and the respective conductive connecting member; a distance between the upper conductive connecting member and the lower conductive connecting member after installation is fixed, and by controlling the deformation of the upper telescoping member and the lower telescoping member, the intermediate conductive connecting member is enabled to drive the guide rods to protrude or recess with respect to the upper conductive connecting member or the lower conductive connecting member, realizing a braille displaying function.

The upper telescoping member or the lower telescoping member is of a memory alloy material, the contraction of which is controllable by supplying power thereto, and a deformation state of which is able to be maintained when power supply to the memory alloy material is stopped.

In the upper conductive connecting member and the lower conductive connecting member, one is in an overall hollow through structure (one-piece structure provided with a through-hole), a column-shaped upper portion being connected with a lower threaded end; the other one is in a one-piece structure provided with a through-hole, an upper threaded end being connected with a column-shaped lower portion.

The intermediate conductive connecting member is in a structure in which the upper and lower threaded ends are connected with a column-shaped intermediate portion, wherein the column-shaped intermediate portion is provided with a wiring hole, and the two threaded ends are each in a structure which is hollow in the middle.

The braille display further includes: an outer frame and signal boards; the outer frame has upper and lower surfaces provided symmetrically with several holes with a certain size, the locations and the number of the holes are matched with those of dots of the recessing-protruding dot array of the braille display; the recessing-protruding dot array is integrally embedded into the outer frame, so that column-shaped portions of the upper conductive connecting member and the lower conductive connecting member are fixed in the symmetrical holes on the upper and lower surfaces of the outer frame, and the guide rod embedded in the upper conductive connecting member exactly passes through a corresponding hole on the surface of the outer frame; and the signal boards are respectively installed at the upper and lower surfaces of the outer frame.

The present invention has the following beneficial effects: the concept of using the memory alloy material to realize the protruding and recessing of the braille dot array can greatly save the product cost; moreover, this structure can enable the braille display to become smaller and thinner, and is easy to carry; besides, since the memory alloy material is used, after the deformation is driven and generated, the deformation is automatically maintained, and in cases where the driving state is not changed, only a chip on a circuit consumes power, while there is no continuous current required for maintaining the braille dot, therefore, the power consumption is low, thus improving the endurance capability.

In the above, 1—upper telescoping member, 2—lower telescoping member, 3—upper conductive connecting member, 4—intermediate conductive connecting member, 5—lower conductive connecting member, 6—external sleeve lock, 7—guide rod, 8—outer frame, 9—signal board, 10—dot.

DETAILED DESCRIPTION OF EMBODIMENTS

Below, preferably examples are described in detail in conjunction with the accompanying drawings.

In the examples of the present invention, a braille display forms one braille dot array by multiple individual dots, and braille displays of different specifications are composed by any number of braille dot arrays as required.

Figure 1:
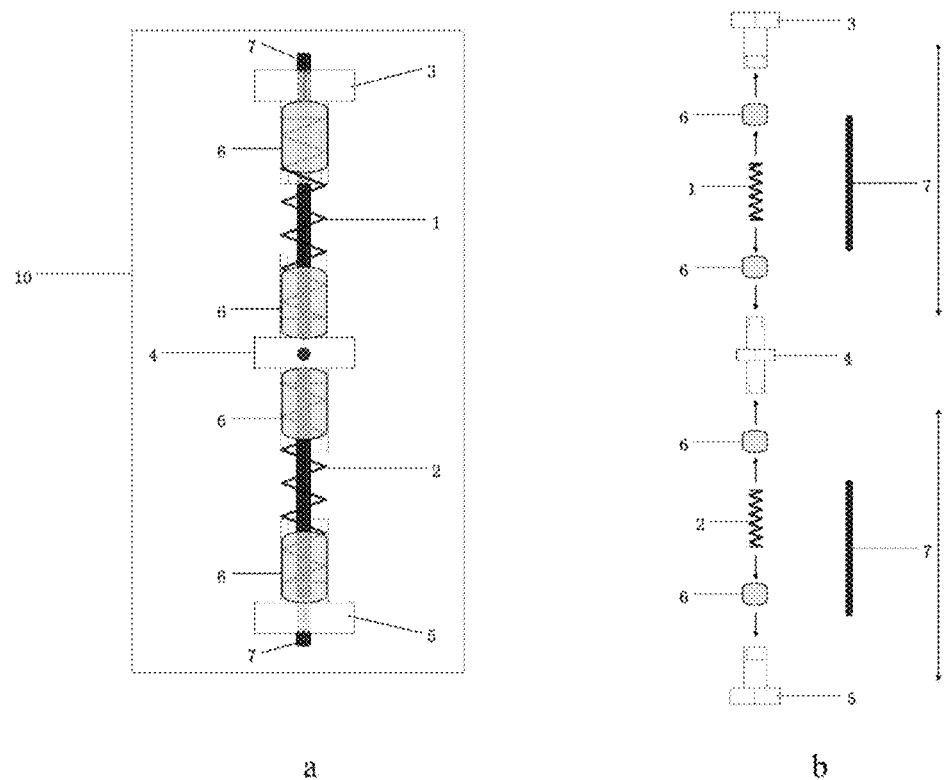
FIG. 1a~1b are structural schematic views of an individual dot of a braille display provided in the present invention.

With reference to FIG. 1a~1b, an individual dot 10 mainly includes 7 parts: an upper telescoping member 1, a lower telescoping member 2, an upper conductive connecting member 3, an intermediate conductive connecting member 4, a lower conductive connecting member 5, external sleeve locks 6, and guide rods 7, wherein the upper telescoping member 1 and the lower telescoping member 2 are of a memory alloy material with a certain length; the upper conductive connecting member 3 and the lower conductive connecting member 5 are each in a one-piece structure provided with a through-hole, a column-shaped upper portion being connected with a lower threaded end; the intermediate conductive connecting member 4 is in a structure in which upper and lower threaded ends are connected with a column-shaped intermediate portion, wherein the threaded ends are each hollow in the middle, and the column-shaped intermediate portion is provided with a wiring hole; the external sleeve locks 6 are each placed at a location where the respective telescoping member and the respective conductive connecting member are connected with each other; and the guide rods 7 each have a slender-bar structure made from a specific material and having a specific length.

Various parts of an individual braille dot 10 are assembled with reference to FIG. 1a and FIG. 1b. The upper conductive connecting member 3 is placed at a top end and has a lower end connected with one end of the upper telescoping member 1, one end of the intermediate connecting member 4 is connected with the other end of the upper telescoping member 1; the lower conductive connecting member 5 is placed at a bottom end, and has an upper end connected with one end of the lower telescoping member 2, and the other end of the intermediate connecting member 4 is connected with the other end of the lower telescoping member 2; the external sleeve locks 6 are each sleeved outside a portion where the respective telescoping member and the respective conductive connecting member are connected, for fixing the telescoping member and the respective conductive connecting member, realizing tight connection therebetween; one end of the guide rod 7 passes through the upper conductive connecting member 3 and the lower conductive connecting member 5 which each have a through hole, and the other end of the guide rod is inserted into the intermediate conductive connecting member 4, and passes through the upper telescoping member 1 and the lower telescoping member 2, realizing the through connection of the whole braille dot.

Figure 2:
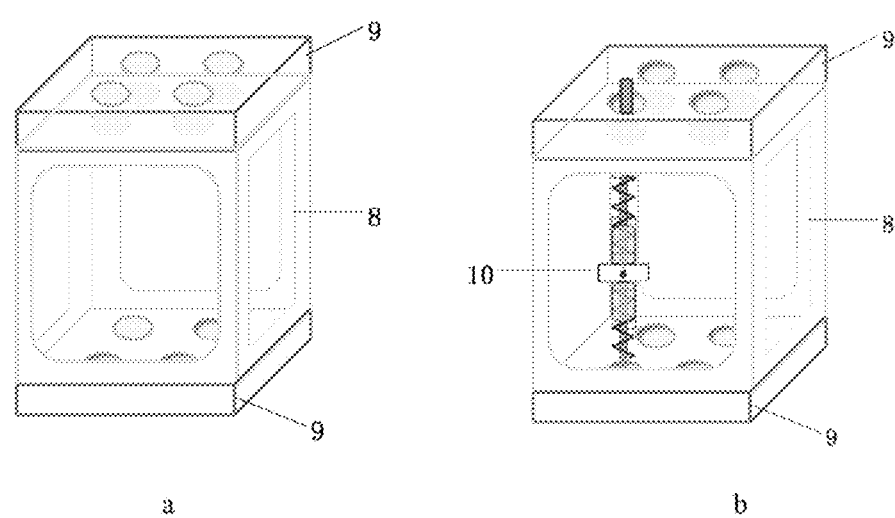
FIG. 2a~FIG. 2b are schematic views showing installation of an individual dot of a braille display provided in the present invention and an accessory fixing component.

Each braille dot array includes: several individual dots 10, an outer frame 8, and signal boards 9, with reference to FIG. 2a and FIG. 2b. The outer frame 8 has a structure designed in such a manner that several holes with a certain size are provided symmetrically on upper and lower surfaces; the individual dot 10 is integrally embedded into the outer frame, so that the column-shaped portions of the upper conductive connecting member 3 and the lower conductive connecting member 5 are fixed in the symmetrical holes on the upper and lower surfaces of the outer frame 8, and the guide rod 7 embedded in the upper conductive connecting member 3 exactly passes through a corresponding hole on the surface of the outer frame 8; and the signal boards 9 are respectively installed at the upper and lower surfaces of the outer frame 8.

Figure 3:
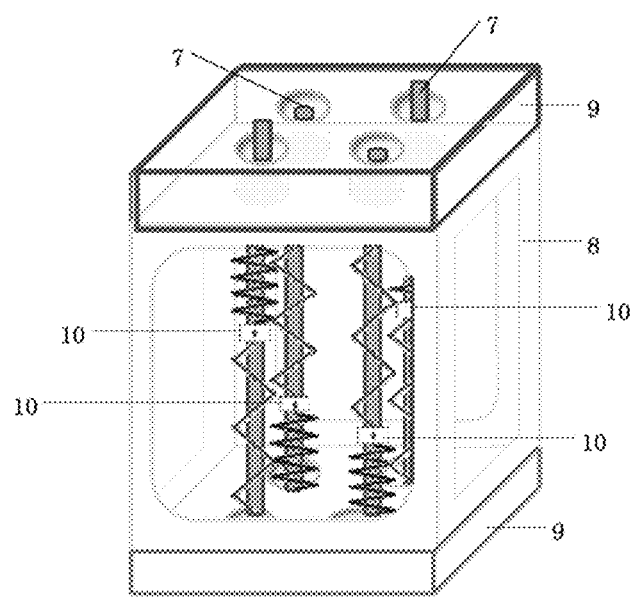
FIG. 3 is a schematic view showing working principle of a braille display provided in the present invention.

Reference is made to FIG. 3 for the implementation of the braille dot array of the whole novel braille display. The upper telescoping member 1 of the individual dot 10 is driven by a current. Since the column-shaped portions of the upper conductive connecting member 3 and the lower conductive connecting member 5 of the individual dot 10 are fixed in the corresponding holes of the outer frame 8, when the upper telescoping member 1 contracts, the lower telescoping member 2 is stretched, so that the guide rod 7, which is embedded from an upper end, extends out of the hole on the upper surface of the outer frame 8 by a certain distance, thus realizing the protruding of the braille dot; the lower telescoping member 2 of the individual dot 10 is driven by a current so that the lower telescoping member 2 contracts, and the upper telescoping member 1 is stretched, so that the guide rod 7, which is embedded from an upper end, returns back into the hole on the upper surface of the outer frame 8, thus realizing the recessing of the braille dot.

A memory alloy designed as a spring is used in the examples of the present invention, and it can be a one-way memory alloy. The design of spring shape firstly ensures the service lifetime of the material (it is obtained from material experiments that the memory deformation within 5,000,000 times is about 2%); secondly, in a cooling state, a protruding dot can be held through coaction of two steady springs, and will not descend due to artificial compression, the full phase transition temperature being 45 degrees.

With such design, stable movement in two directions, i.e. up and down, can be realized, and the movement of respective dots also can be independent from each other and will not be affected.

The foregoing are merely for specific implementations of the present invention, while the scope of protection of the present invention is not limited thereto. Any variations or substitutions that would readily occur to any skilled person familiar with the present technical field should fall into the scope of protection of the present invention. Therefore, the scope of protection of the present invention should be determined by the scope of protection of the claims.

The invention claimed is:

1. A braille display, wherein a recessing-protruding dot array of the braille display is formed by arranging plural dots, each dot comprises: an upper telescoping member, a lower telescoping member, an upper conductive connecting member, an intermediate conductive connecting member, a lower conductive connecting member, external sleeve locks, and guide rods, wherein the guide rods comprise an upper guide rod and a lower guide rod, with the two guide rods coaxially vertically arranged and fixed through the intermediate conductive connecting member, a top end of the intermediate conductive connecting member is connected with the upper conductive connecting member through the upper telescoping member, a bottom end of the intermediate conductive connecting member is connected with the lower conductive connecting member through the lower telescoping member; the external sleeve locks are each placed at a location where respective telescoping member and respective conductive connecting member are connected with each other, for fixing the respective telescoping member and the respective conductive connecting member; a distance between the upper conductive connecting member and the lower conductive connecting member after installation is fixed, and by controlling deformation of the upper telescoping member and the lower telescoping member, the intermediate conductive connecting member is enabled to drive the guide rods to protrude or recess with respect to the upper conductive connecting member or the lower conductive connecting member, realizing a braille displaying function.

2. The braille display of claim 1, wherein the upper telescoping member or the lower telescoping member is of a memory alloy material, contraction of which is controllable by supplying power to the memory alloy material, and a deformation state of which is able to be maintained when power supply to the memory alloy material is stopped.

3. The braille display of claim 1, wherein in the upper conductive connecting member and the lower conductive connecting member; one is in a one-piece structure provided with a through-hole, a column-shaped upper portion being connected with a lower threaded end, and other one is in a one-piece structure provided with a through-hole, an upper threaded end being connected with a column-shaped lower portion.

4. The braille display of claim 1, wherein the intermediate conductive connecting member is in a structure in which an upper threaded end and a lower threaded end are connected with a column-shaped intermediate portion, the column-shaped intermediate portion is provided with a wiring hole, and the two threaded ends are each in a structure which is hollow in middle.

5. The braille display of claim 1, wherein the braille display further comprises an outer frame and signal boards; the outer frame has upper and lower surfaces provided symmetrically with several holes with a certain size, locations and number of the holes are matched with locations and number of dots of the recessing-protruding dot array of the braille display; the recessing-protruding dot array is integrally embedded into the outer frame, so that column-shaped portions of the upper conductive connecting member and the lower conductive connecting member are fixed in the symmetrical holes on the upper and lower surfaces of the outer frame, and the guide rods embedded in the upper conductive connecting member are each configured to exactly pass through a corresponding hole on the surface of the outer frame; and the signal boards are respectively installed at the upper and lower surfaces of the outer frame.

6. The braille display of claim 2, wherein the braille display further comprises an outer frame and signal boards; the outer frame has upper and lower surfaces provided symmetrically with several holes with a certain size, locations and number of the holes are matched with locations and number of dots of the recessing-protruding dot array of the braille display; the recessing-protruding dot array is integrally embedded into the outer frame, so that column-shaped portions of the upper conductive connecting member and the lower conductive connecting member are fixed in the symmetrical holes on the upper and lower surfaces of the outer frame, and the guide rods embedded in the upper conductive connecting member are each configured to exactly pass through a corresponding hole on the surface of the outer frame; and the signal boards are respectively installed at the upper and lower surfaces of the outer frame.

7. The braille display of claim 3, wherein the braille display further comprises an outer frame and signal boards; the outer frame has upper and lower surfaces provided symmetrically with several holes with a certain size, locations and number of the holes are matched with locations and number of dots of the recessing-protruding dot array of the braille display; the recessing-protruding dot array is integrally embedded into the outer frame, so that column-shaped portions of the upper conductive connecting member and the lower conductive connecting member are fixed in the symmetrical holes on the upper and lower surfaces of the outer frame, and the guide rods embedded in the upper conductive connecting member are each configured to exactly pass through a corresponding hole on the surface of the outer frame; and the signal boards are respectively installed at the upper and lower surfaces of the outer frame.

8. The braille display of claim 4, wherein the braille display further comprises an outer frame and signal boards; the outer frame has upper and lower surfaces provided symmetrically with several holes with a certain size, locations and number of the holes are matched with locations and number of dots of the recessing-protruding dot array of the braille display; the recessing-protruding dot array is integrally embedded into the outer frame, so that column-shaped portions of the upper conductive connecting member and the lower conductive connecting member are fixed in the symmetrical holes on the upper and lower surfaces of the outer frame, and the guide rods embedded in the upper conductive connecting member are each configured to exactly pass through a corresponding hole on the surface of the outer frame; and the signal boards are respectively installed at the upper and lower surfaces of the outer frame.

* * * * *